(12) United States Patent
Chung et al.

(10) Patent No.: US 9,876,437 B2
(45) Date of Patent: Jan. 23, 2018

(54) INTERLEAVED TRANSFORMER/INDUCTOR

(71) Applicant: Lenovo Enterprise Solutions (Singapore) Pte. Ltd., Singapore (SG)

(72) Inventors: Chu T. Chung, Cary, NC (US); Marc H. Coq, Hopewell Junction, NY (US); Cecil C. Dishman, Raleigh, NC (US); Chien H. Lin, Taipei (TW); Randhir S. Malik, Cary, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 651 days.

(21) Appl. No.: 14/497,400

(22) Filed: Sep. 26, 2014

(65) Prior Publication Data

US 2016/0093432 A1   Mar. 31, 2016

(51) Int. Cl.
| | |
|---|---|
| *H02M 3/335* | (2006.01) |
| *H01F 3/14* | (2006.01) |
| *H01F 27/38* | (2006.01) |
| *H02M 3/28* | (2006.01) |

(52) U.S. Cl.
CPC .......... *H02M 3/33569* (2013.01); *H01F 3/14* (2013.01); *H01F 27/38* (2013.01); *H02M 3/285* (2013.01)

(58) Field of Classification Search
CPC .. H02M 3/1582; H02M 3/1584; H02M 3/335; H02M 3/33523; H02M 3/285; G01R 31/42; G01R 15/202; G01R 19/0092; H01F 38/32

USPC ..... 324/117 R, 76.11, 117 H, 200, 211, 253, 324/127, 547, 726, 445, 207.15, 654, 600, 324/76.75; 381/96, 59
See application file for complete search history.

(56) References Cited

U.S. PATENT DOCUMENTS

| | | |
|---|---|---|
| 3,849,701 A | 11/1974 | Kerfoot et al. |
| 4,613,841 A | 9/1986 | Roberts |
| 4,994,952 A | 2/1991 | Silva et al. |
| 5,742,897 A | 4/1998 | Plowdrey et al. |
| 5,784,266 A | 7/1998 | Chen |
| 5,790,005 A | 8/1998 | Santi et al. |
| 6,320,490 B1 | 11/2001 | Clayton |
| 6,388,898 B1 | 5/2002 | Fan et al. |
| 6,734,773 B2 | 5/2004 | Ackermann |
| 6,807,069 B2 | 10/2004 | Nieminen et al. |
| 6,952,353 B2 | 10/2005 | Yan et al. |
| 7,034,647 B2 | 4/2006 | Yan et al. |
| 7,646,279 B2 | 1/2010 | Limpkin et al. |
| 7,675,764 B2 | 3/2010 | Chandrasekaran et al. |
| 8,223,509 B2 | 7/2012 | Won et al. |

(Continued)

*Primary Examiner* — Melissa Koval
*Assistant Examiner* — Trung Nguyen
(74) *Attorney, Agent, or Firm* — Jeffrey L. Streets

(57) ABSTRACT

An interleaved transformer or a transformer and integrated set of inductors formed via a magnetic structure comprising a set of E cores and an I core inserted between the set of E cores is provided in order to address issues that occur when a structured transformer is coupled together with inductor flux. Actual inductance exhibited by the transformers is controlled by a preselected precise gap between the I core and each of the E cores. The advantage of such a structured transformer cancels out the magnetic flux in certain legs of the magnetic structure requiring less magnetic material and thus, less core losses while improving the overall efficiency of a power supply.

16 Claims, 6 Drawing Sheets

(56) References Cited

U.S. PATENT DOCUMENTS

| | | |
|---|---|---|
| 2003/0185021 A1 | 10/2003 | Huang et al. |
| 2009/0115564 A1* | 5/2009 | Minteer .............. H01F 27/2804 336/84 M |
| 2011/0063065 A1 | 3/2011 | Hugues Douglas et al. |
| 2012/0025606 A1 | 2/2012 | Zheng et al. |
| 2012/0081204 A1* | 4/2012 | Garrity .............. H01F 27/2847 336/221 |
| 2012/0201053 A1 | 8/2012 | Lu et al. |
| 2013/0250623 A1 | 9/2013 | Xu et al. |

\* cited by examiner

INTERLEAVED TRANSFORMER/INDUCTOR

BACKGROUND

The present application relates generally to an improved magnetic structure for an interleaved transformer/inductor.

A transformer is a device that transfers electrical energy from one circuit to another through inductively coupled conductors or coils. A varying current in the first or primary winding creates a varying magnetic flux in the transformer and thus a varying magnetic field through a second or secondary winding. This varying magnetic field induces a varying electromotive force (EMF), or "voltage," in the secondary winding. This effect is referred to as inductive coupling. Transformers range in size from on-chip transformers occupying the area less than one square millimeter to huge units weighing hundreds of tons used to interconnect portions of power grids.

An inductor is a passive two-terminal electrical component that resists changes in electric current passing through it. An inductor comprises a conductor such as a wire, usually wound into a coil. When a current flows through an inductor, energy is stored temporarily in a magnetic field in the coil. When the current flowing through an inductor changes, the time-varying magnetic field induces a voltage in the conductor, according to Faraday's law of electromagnetic induction, which opposes the change in current that created it.

However, regardless of size, all transformers operate on the same basic principles and, although the range of transformer designs is wide, currently existing structured transformers, when coupled together with inductor flux, exhibit issues, such as magnetic saturation, noise/ripple voltage, and/or poor efficiency.

SUMMARY

In one illustrative embodiment, an apparatus is provided for doubling the current of a circuit via a full-bridge current-doubler rectifier. In the illustrative embodiment, a three-core magnetic structure is electrically coupled to an input circuit. In the illustrative embodiment, a first drive signal drives a first set of transistors thereby causing a first voltage to be induced into a primary winding of the three-core magnetic structure. In the illustrative embodiment, a second drive signal drives a second set of transistors thereby causing a second voltage to be induced into the primary winding of the three-core magnetic structure. In the illustrative embodiment, the first drive signal operates out-of-phase with the second drive signal. In the illustrative embodiment, when the first drive signal operates out-of-phase, a varying magnetic field is impinged on a secondary winding of an output circuit that is electrically coupled to the three-core magnetic structure. In the illustrative embodiment, the secondary winding detects the varying magnetic field induced by primary winding. In the illustrative embodiment, the output circuit outputs a current as a result of the varying magnetic field. In the illustrative embodiment, the current is doubled by summing an average current flowing through a first inductor winding and an average current flowing through a second inductor winding.

In other illustrative embodiments, an apparatus is provided for providing a constant DC voltage via an interleaved two-switch forward converter. In the illustrative embodiment, a three-core magnetic structure is electrically coupled to a first input circuit and a second input circuit. In the illustrative embodiment, a first drive signal drives a first set of transistors in the first input circuit thereby causing a first voltage to be induced into a first primary winding of the three-core magnetic structure. In the illustrative embodiment, a second drive signal drives a second set of transistors in the second input circuit thereby causing a second voltage to be induced into a second primary winding of the three-core magnetic structure. In the illustrative embodiment, the first drive signal operates out-of-phase with the second drive signal. In the illustrative embodiment, by the first drive signal operating out-of-phase, a varying magnetic field is impinged on a first secondary winding associated with the first primary winding and a second secondary winding associated with the second primary winding of an output circuit electrically coupled to the three-core magnetic structure. In the illustrative embodiment, the first secondary winding and the second secondary winding detects the varying magnetic field induced by the first primary winding and the second primary winding. In the illustrative embodiment, the output circuit outputs a direct current voltage as a result of the varying magnetic field. In the illustrative embodiment, the direct current voltage is constant due to inductor-capacitor filtering in the output circuit.

In yet another illustrative embodiment, a core-assembly apparatus is provided for assembling a three-core magnetic structure. In the illustrative embodiment, a first duct receives an insertion of an I core. In the illustrative embodiment, a second duct receives an insertion of a first E core. In the illustrative embodiment, the insertion of the first E core into the second duct causes legs of the first E core to come within a precise predetermined distance of a first side of the I core. In the illustrative embodiment, a third duct receives an insertion of a second E core. In the illustrative embodiment, the insertion of the second E core into the third duct causes legs of the first E core to come within a precise predetermined distance of a second side of the I core.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings.

DETAILED DESCRIPTION

In order to address issues that occur when a structured transformer is coupled together with inductor flux, the illustrative embodiments provide an interleaved transformer or a transformer and integrated set of inductors formed via a magnetic structure comprising a set of E cores and an I core inserted between the set of E cores. A magnetic core is a piece of magnetic material with a high permeability used to confine and guide magnetic fields in electrical, electromechanical, and magnetic devices. An E core is an E-shaped core, such that there are three leg segments coupled perpendicularly to a single core segment. An I core is a single I-shaped core segment. The actual inductance exhibited by the transformer of the illustrative embodiments is controlled by a preselected precise gap between the I core and each of the E cores. The advantage of such a structured transformer cancels out the magnetic flux in certain legs of the magnetic structure requiring less magnetic material and thus, less core losses while improving the overall efficiency of a power supply.

Figure 1:
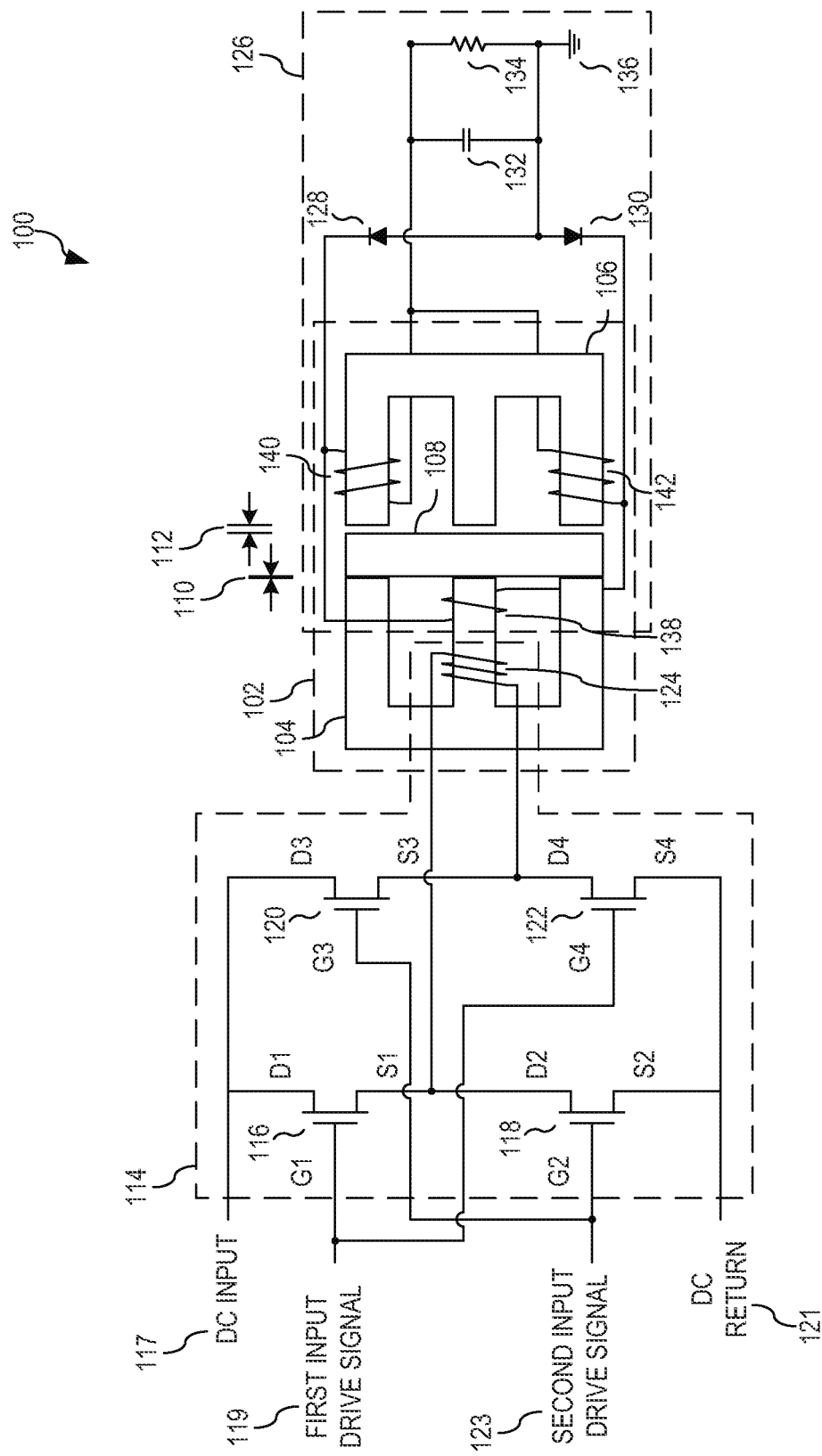
FIG. 1 depicts a full-bridge current-doubler rectifier in accordance with an illustrative embodiment.

FIG. 1 depicts a full-bridge current-doubler rectifier in accordance with an illustrative embodiment. That is, the circuitry depicted in FIG. 1 includes full-bridge rectifier circuitry coupled to current-doubling circuitry via a three-core magnetic structure where, based on drive signals input into the full-bridge rectifier circuitry, a doubling of output current is realized across a load of the current-doubling circuitry. Therefore, with regard to FIG. 1, full-bridge current-doubler rectifier 100 comprises a three-core magnetic structure 102 formed by E core 104, E core 106, and I core 108. As is illustrated, the legs of E core 104 face the legs of E core 106 with I core 108 inserted between the legs of the E core 104 and E core 106. E core 104 is separated from I core 108 by first preselected precise gap 110 and, likewise, E core 106 is separated from I core 108 by second preselected precise gap 112. In accordance with the illustrative embodiments, first preselected precise gap 110 is a small gap at no larger than a few microns, such as no larger than 10 microns, while second preselected precise gap 112 may be as much as 1 millimeter. The variance in second preselected precise gap 112 controls the inductance generated in full-bridge current-doubler rectifier 100.

Full-bridge current-doubler rectifier 100 also includes full-bridge rectifier circuitry 114 coupled to E core 104. Full-bridge rectifier circuitry 114 comprises N-channel metal-oxide-semiconductor field-effect transistor (MOSFET) (NMOS) 116, NMOS 118, NMOS 120, and NMOS 122. Each of NMOS 116, 118, 120, and 122 have a source terminal (S), a drain terminal (D), and gate terminal (G). Full-bridge rectifier circuitry 114 is configured such that drain D1 of NMOS 116 is coupled to drain D3 of NMOS 120 and DC input voltage 117, source S1 is coupled to drain D2 of NMOS 118, and gate G1 is coupled to first input drive signal 119. With regard to NMOS 118, drain D2 is coupled to source S1 of NMOS 116, source S2 is coupled to source S4 of NMOS 122 and primary DC return 121, and gate G2 is coupled to second input drive signal 123. The drain D3 of NMOS 120 is coupled to drain D1 of NMOS 116 and DC input voltage 117, the source S3 is coupled to the drain D4 of NMOS 122, and the gate G3 is coupled to second input drive signal 123. Finally, the drain D4 of NMOS 122 is coupled to the source S3 of NMOS 120, the source S4 is coupled to the source S2 of NMOS 118 and primary DC return 121, and the gate G4 is coupled to first input drive signal 119.

Figure 2:
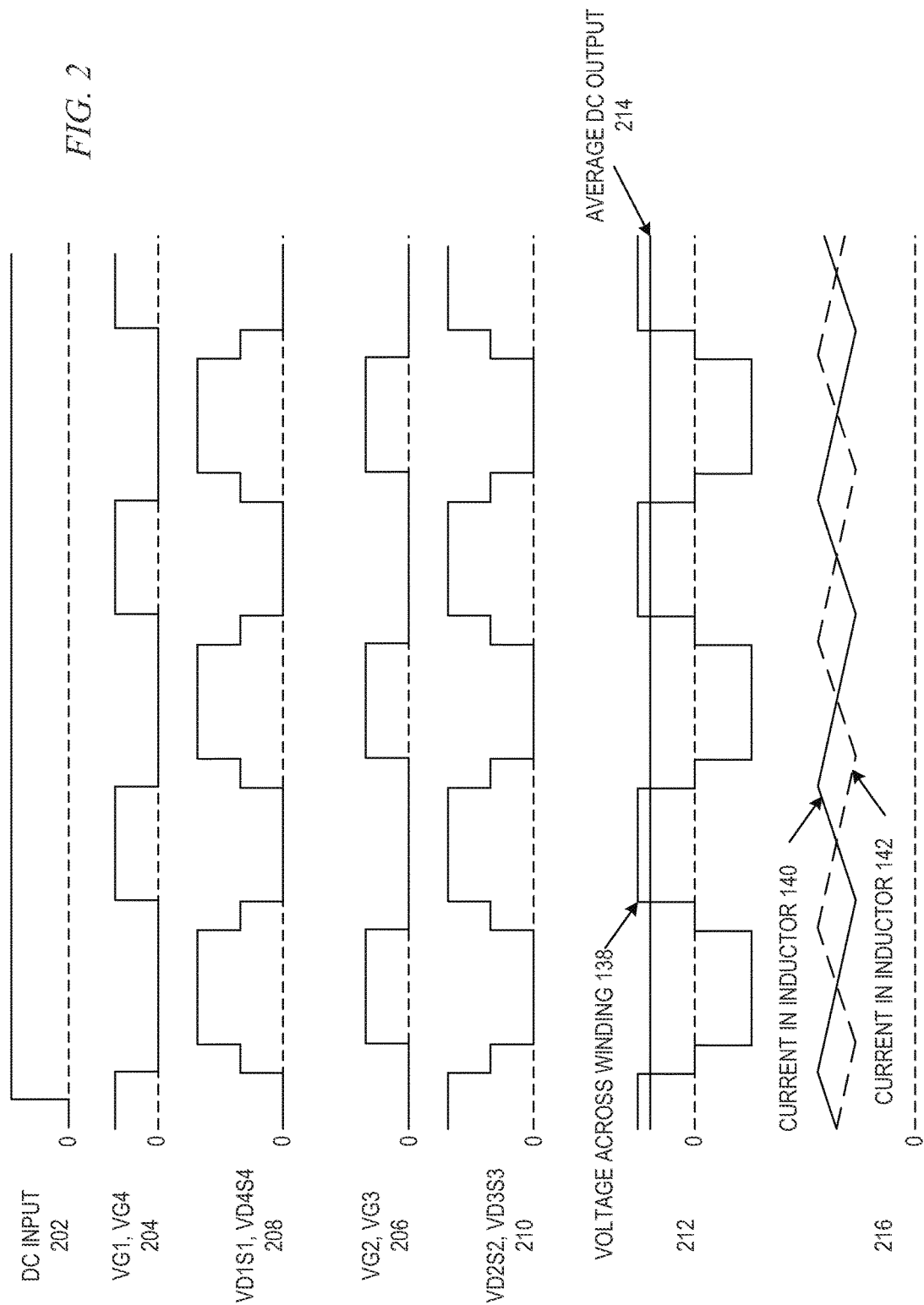
FIG. 2 illustrates timing diagrams associated with the full-bridge current-doubler rectifier of FIG. 1 in accordance with an illustrative embodiment.

In addition to the couplings between NMOS 116, 118, 120, and 122, input circuitry 114 also includes a primary winding 124 that is coiled around the middle leg of E core 104, with a first end coupled to source S1 of NMOS 116 and drain D2 of NMOS 118 and with a second end coupled to source S3 of NMOS 120 and drain D4 of NMOS 122. In operation, with reference to FIG. 2, first input drive signal 119 operates independently and opposite from second input drive signal 123. That is, when first input drive signal 119 is active, second input drive signal 123 must be inactive and, when second input drive signal 123 is active, first input drive signal 119 must be inactive. However, there are times when both first input drive signal 119 and second input drive signal 123 may be inactive. As is shown in FIG. 2, timing diagram 202 illustrates a DC input voltage 117 to full-bridge rectifier circuitry 114. Timing diagram 204 illustrates time periods where first input drive signal 119 is active to gate G1 of NMOS 116 and gate G4 of NMOS 122 and timing diagram 206 illustrates time periods where second input drive signal 123 is active to gate G2 of NMOS 118 and gate G3 of NMOS 120. Based on these time periods, timing diagram 208 shows that when NMOSs 116 and 122 are inactive and NMOSs 118 and 120 are active, the voltage across NMOSs 116 and 122 is equal to DC input voltage 117. Similarly, timing diagram 210 shows that when NMOSs 118 and 120 are inactive and NMOSs 116 and 122 are active, the voltage across NMOSs 118 and 120 is equal to DC input voltage 117. Therefore, full-bridge rectifier circuitry 114 generates a varying magnetic flux in E core 104 and, thus a varying magnetic field impinging on a secondary winding, which will be described with regard to output circuitry 126 below. The varying magnetic field induces a varying electromotive force (EMF) or voltage in the secondary winding.

Full-bridge current-doubler rectifier 100 also includes current-doubling circuitry 126 coupled to both E core 104 and E core 106. Current-doubling circuitry 126 includes diode 128, diode 130, capacitor 132, and resistor 134. Current-doubling circuitry 126 is configured such that the anode of diode 128 is coupled to the anode of diode 130 as well the second side of capacitor 132, the second side of resistor 134, and to ground 136. Current-doubling circuitry 126 is further configured such that the cathode of diode 128 is coupled to the cathode of diode 130 via secondary winding 138, which is coiled around the middle leg of E core 104. The cathode of diode 128 is further coupled to the first side of capacitor 132 and the first side of resistor 134 via inductor coil 140. Inductor coil 140 is coiled around a first outer leg of E coil 106. The cathode of diode 130 is further coupled to the first side of capacitor 132 and the first side of resistor 134 via inductor coil 142. Inductor coil 142 is coiled around a second outer leg of E coil 106. As is illustrated, the second side of inductor coil 140 is coupled to the second side of inductor coil 142.

In operation, when first input drive signal 119 and second input drive signal 123 operate as shown in timing diagrams 204 and 206 and the voltages shown in timing diagrams 208 and 210 are realized in NMOSs 116, 118, 120, and 122, respectively, and thus in primary winding 124, current-doubling circuitry 126 detects a varying magnetic field impinging by primary winding 124 in secondary winding 138. The varying magnetic field induced by primary winding 124 is detected by secondary winding 138 as a varying electromotive force (EMF) or voltage as is illustrated in timing diagram 212 of FIG. 2. As is illustrated in timing diagram 212, the varying magnetic field induced by primary winding 124 is detected by secondary winding 138 and is increased by flux that is realized by inductor coils 140 and 142 which is output as average DC output voltage 214 across resistor 134, which is the load on current-doubling circuitry 126. That is, when the upper end of secondary winding 138 is positive with respect to the lower end of secondary winding 138, current flows through inductor 140, capacitor 132, and diode 130 to the lower end of secondary winding 138. This current pulse charges the capacitor 132 to develop a DC output voltage. Similarly, when the voltage across secondary winding 138 reverses, the bottom side of secondary winding 138 becomes positive with respect to the topside of secondary winding 138, the current starts flowing from the lower end of secondary winding 138, through inductor 142, capacitor 132, and diode 128 and back to the top side of secondary winding 138, thereby charging capacitor 132 to develop a positive DC voltage as is illustrated by average DC output voltage 214. The amount of flux that is added to the voltage detected by secondary winding 138 may be increased by decreasing gap 112 or may be decreased by increasing gap 112. Further, the average current flowing to resistor 134 (i.e., the load of current-doubling circuitry 126) is the sum of the average current flowing through each of inductors 140 and 142 as is shown in timing diagram 216 of FIG. 2. As these inductor currents are equal and add up, so current-doubling circuitry 126 is referred to as a current doubler.

Therefore, full-bridge current-doubler rectifier 100 uses a single magnetic structure as compared to three separate magnetic structures, i.e. one transformer, and two inductors. The advantage of bridge current-doubler rectifier 100 is lower magnetic losses due to cancellation of flux in the common core element. In addition, the size bridge current-doubler rectifier 100 is smaller than three individual structures, which provides an increase in power density.

Figure 3:
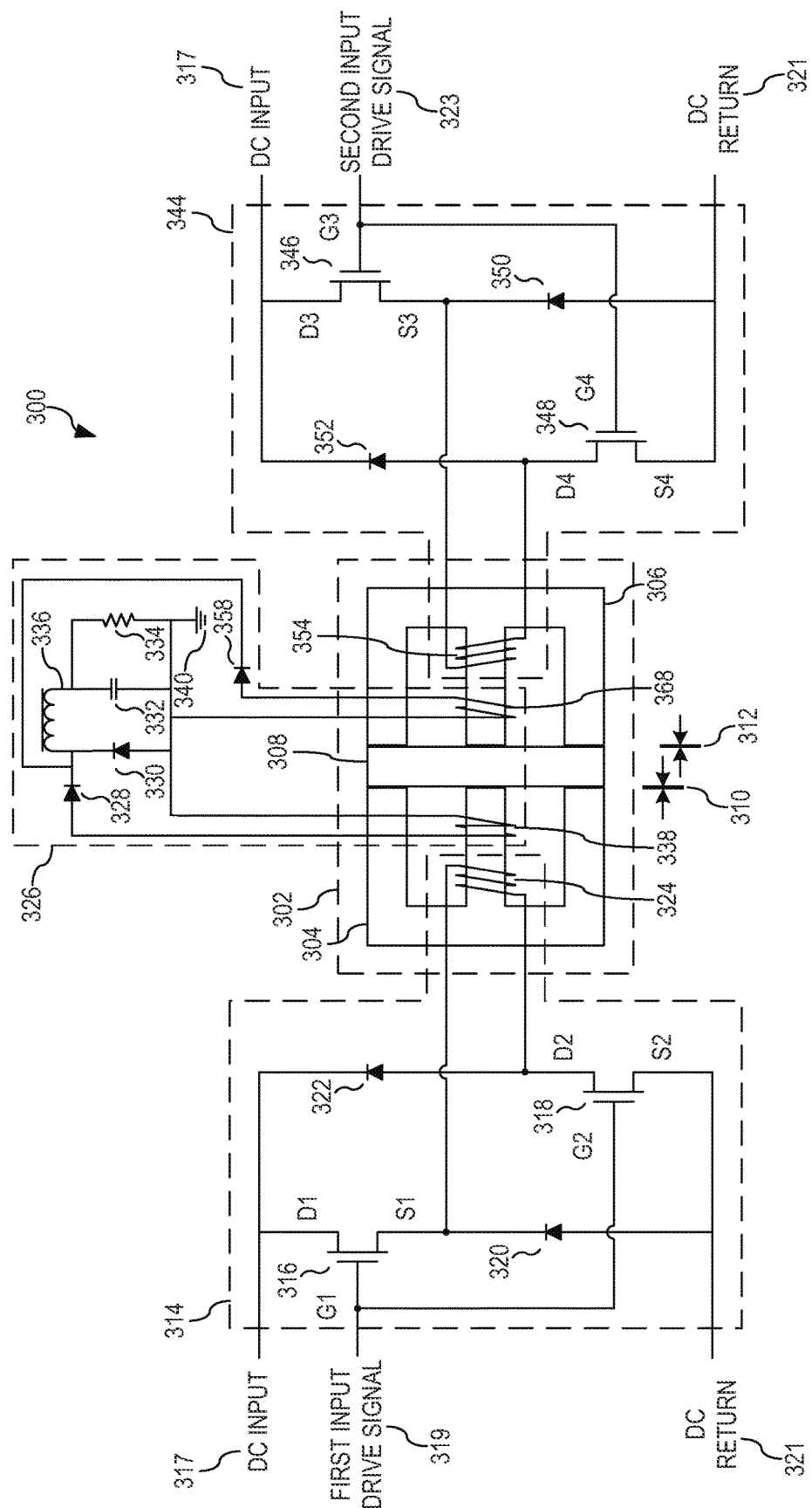
FIG. 3 depicts an interleaved two-switch forward converter in accordance with an illustrative embodiment.

FIG. 3 depicts an interleaved two-switch forward converter in accordance with an illustrative embodiment. That is, the circuitry depicted in FIG. 3 comprises both a first and a second two-switch forward circuitry coupled to rectifying-filtering circuitry via a three-core magnetic structure where, based on drive signals input into the first and second two-switch forward circuitry, a constant DC voltage is output. Therefore, with regard to FIG. 3, interleaved two-switch forward converter 300 comprises a three-core magnetic structure 302 formed by E core 304, E core 306, and I core 308. As is illustrated, the legs of E core 304 face the legs of E core 306 with I core 308 inserted between the legs of the E core 304 and E core 306. E core 304 is separated from I core 308 by preselected precise gap 310 and, likewise, E core 306 is separated from I core 308 by preselected precise gap 312. In accordance with the illustrative embodiments, both preselected gap 310 and preselected gap 312 are small gaps at no larger than a few microns, such as no larger than 10 microns.

Interleaved two-switch forward converter 300 also includes first two-switch forward circuitry 314 coupled to E core 304. First two-switch forward circuitry 314 includes N-channel metal-oxide-semiconductor field-effect transistor (MOSFET) (NMOS) 316, NMOS 318, diode 320, and diode 322. Each of NMOS 316 and 318 have a source terminal (S), a drain terminal (D), and gate terminal (G). First two-switch forward circuitry 314 is configured such that drain D1 of NMOS 316 is coupled to the cathode of diode 322 and DC input voltage 317, source S1 is coupled to cathode of diode 320, and gate G1 is coupled to first input drive signal 319. With regard to diode 320, the cathode is coupled to source S1 of NMOS 316, the anode is coupled to source S2 of NMOS 318 and primary DC return 321. The cathode of diode 322 is coupled to the drain D1 of NMOS 316 and DC input voltage 317, and the anode is coupled to the drain D2 of NMOS 318. Finally, the drain D2 of NMOS 318 is coupled to the anode of diode 322, the source S2 is coupled to the anode of diode 320 and primary DC return 321, and the gate G2 is coupled to first input drive signal 319.

Figure 4:
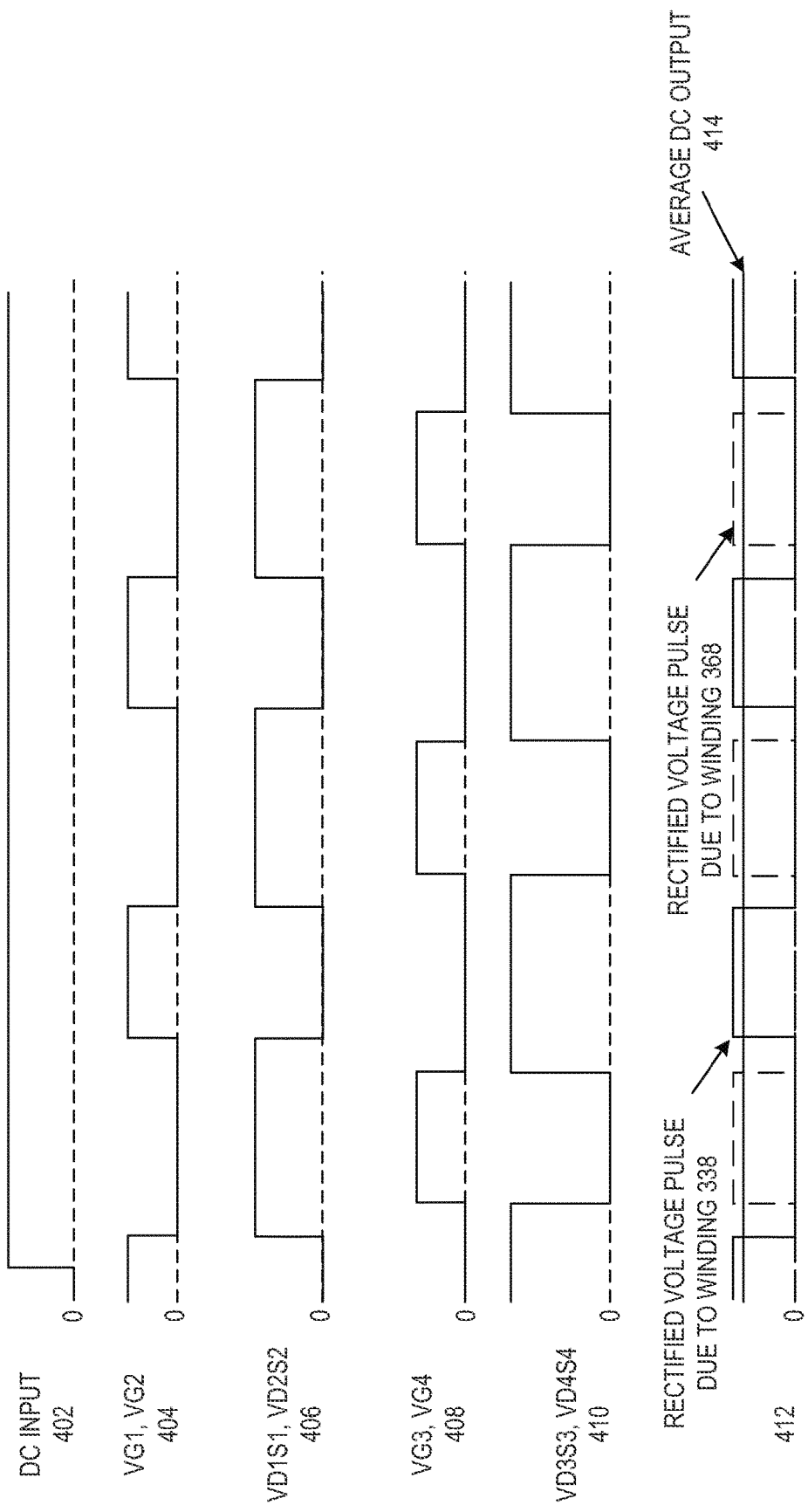
FIG. 4 illustrates timing diagrams associated with the interleaved two-switch forward converter of FIG. 3 in accordance with an illustrative embodiment.

In addition to the couplings between NMOS 316, NMOS 318, diode 320, and diode 322, first two-switch forward circuitry 314 also includes a primary winding 324 that is coiled around the middle leg of E core 304, with a first end coupled to source S1 of NMOS 316 and the cathode of diode 320 and with a second end coupled to the anode of diode 322 and drain D2 of NMOS 318. In operation, with reference to FIG. 4, first input drive signal 319 operates 180 degrees out-of-phase with second input drive signal 323, which is described in detail below. That is, when first input drive signal 319 is active, second input drive signal 323 must be inactive and, when second input drive signal 323 is active, first input drive signal 319 must be inactive. However, there are times when both first input drive signal 319 and second input drive signal 323 may be inactive. As is shown in FIG. 4, timing diagram 402 illustrates a DC input voltage 317 to full-bridge rectifier circuitry 314. Timing diagram 404 illustrates time periods where first input drive signal 319 is active to gate G1 of NMOS 316 and gate G2 of NMOS 318. Thus, when first input drive signal 319 operates as shown in timing diagram 404, the voltages shown in timing diagram 406 is realized in NMOSs 316 and 318 and thus, in primary winding 324. Therefore, first two-switch forward circuitry 314 generates a varying magnetic flux in E core 304 and, thus a varying magnetic field impinging on a secondary winding, which will be described with regard to output circuitry 326 below. The varying magnetic field induces a varying electromotive force (EMF) or voltage in the secondary winding.

Interleaved two-switch forward converter 300 also includes second two-switch forward circuitry 344 coupled to E core 306. Second two-switch forward circuitry 344 comprises N-channel metal-oxide-semiconductor field-effect transistor (MOSFET) (NMOS) 346, NMOS 348, diode 350, and diode 352. Each of NMOS 346 and 348 have a source terminal (S), a drain terminal (D), and gate terminal (G). Second two-switch forward circuitry 344 is configured such that drain D3 of NMOS 346 is coupled to the cathode of diode 352 and DC input voltage 317, source S3 is coupled to cathode of diode 350, and gate G3 is coupled to second input drive signal 323. With regard to diode 350, the cathode is coupled to source S3 of NMOS 346, the anode is coupled to source S4 of NMOS 348 and primary DC return 321. The cathode of diode 352 is coupled to the drain D3 of NMOS 346 and DC input voltage 317, and the anode is coupled to the drain D4 of NMOS 348. Finally, the drain D4 of NMOS 348 is coupled to the anode of diode 352, the source S4 is coupled to the anode of diode 350 and primary DC return 321, and the gate G2 is coupled to second input drive signal 323.

In addition to the couplings between NMOS 346, NMOS 348, diode 350, and diode 352, second two-switch forward circuitry 344 also includes a primary winding 354 that is coiled around the middle leg of E core 306, with a first end coupled to source S3 of NMOS 346 and the cathode of diode 350 and with a second end coupled to the anode of diode 352 and drain D4 of NMOS 348. In operation, with reference to FIG. 4, second input drive signal 323 operates 180 degrees out-of-phase with first input drive signal 319. That is, when second input drive signal 323 is active, first input drive signal 319 must be inactive and, when first input drive signal 319 is active, second input drive signal 323 must be inactive. However, there are times when both first input drive signal 319 and second input drive signal 323 may be inactive. Timing diagram 408 illustrates time periods where second input drive signal 323 is active to gate G3 of NMOS 346 and gate G4 of NMOS 348. Thus, when second input drive signal 323 operates as shown in timing diagram 408, the voltages shown in timing diagram 410 is realized in NMOSs 346 and 348 and thus, in primary winding 354. Therefore, second two-switch forward circuitry 344 generates a varying magnetic flux in E core 306 and, thus a varying magnetic field impinging on a secondary winding, which will be described with regard to output circuitry 326 below. The varying magnetic field induces a varying electromotive force (EMF) or voltage in the secondary winding.

Interleaved two-switch forward converter 300 also includes output circuitry 326 coupled to E core 304. Output circuitry 326 includes diode 328, diode 330, capacitor 332, resistor 334, inductor 336, and diode 358. Output circuitry 326 is configured such that the cathode of diode 328 is coupled to the cathode of diode 330, the cathode of diode 358, and a first side of inductor 336. The second side of inductor 336 is coupled to the first side of capacitor 332 and the first side of resistor 334. Output circuitry 326 is further configured such that the anode of diode 328 is coupled to the anode of diode 330 via secondary winding 338, which is coiled around the middle leg of E core 304. The anode of diode 330 is further coupled to the second side of capacitor 332, the second side of resistor 334, and ground 340. Still further, output circuitry is configured such that the anode of diode 358 is coupled to the anode of diode 330 via secondary winding 368, which is coiled around the middle leg of E core 306.

In operation, when first input drive signal 319 and second input drive signal 323 operate as shown in timing diagrams 404 and 408 and the voltages shown in timing diagrams 406 and 410 are realized in NMOSs 316, 318, 346, and 348, respectively, and thus in primary winding 324 and 354, output circuitry 326 detects a varying magnetic field impinging by primary winding 324 in secondary winding 338 and a varying magnetic field impinging by primary winding 354 in secondary winding 368. The varying magnetic field induced by primary windings 324 and 354 is detected by secondary windings 338 and 368 as a varying electromotive force (EMF) or voltage as is illustrated in timing diagram 412 of FIG. 4. As is illustrated in timing diagram 412, the varying magnetic field induced by primary winding 324 is detected by secondary winding 338 and the varying magnetic field induced by primary winding 354 is detected by secondary winding 368 that results in output as average DC output voltage 414 across resistor 334, which is the load on current-doubling circuitry 326. The DC output is constant due to the inductor-capacitor (LC) filtering that is provided by capacitor 332 and inductor 336.

Therefore, interleaved two-switch forward converter 300 uses as single magnetic structure as compared two transformers of previous implementations. The advantage of interleaved two-switch forward converter 300 is one small magnetic structure with flux cancellation in the center leg thereby reducing core losses and improving efficiency.

Figure 5:
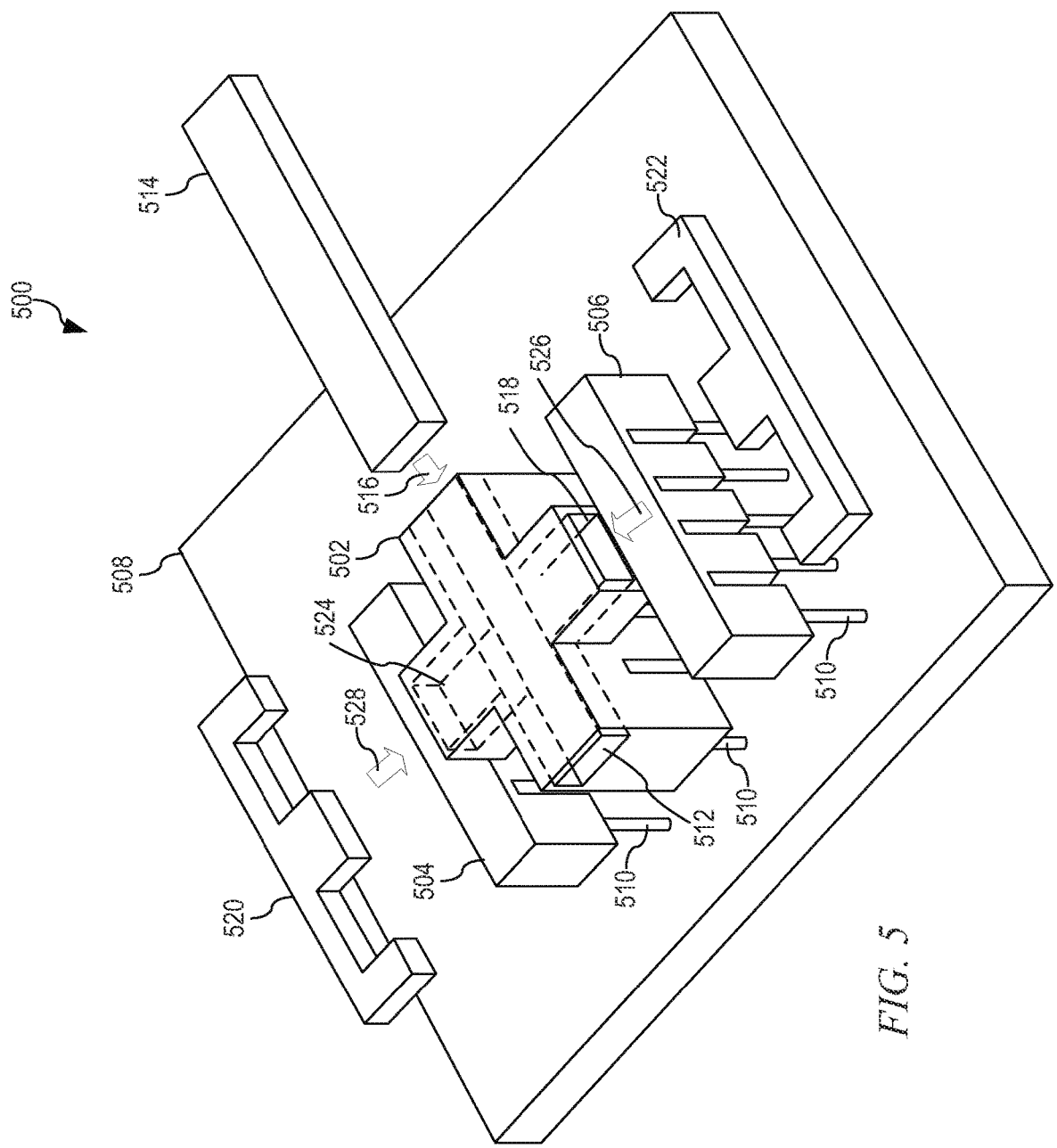
FIG. 5 depicts a core-assembly mechanism for assembling a three-core magnetic structure, such as three-core magnetic structure 102 of FIG. 1 or a three-core magnetic structure 302 of FIG. 3 in accordance with an illustrative embodiment.

FIG. 5 depicts a core-assembly mechanism for assembling a three-core magnetic structure, such as three-core magnetic structure 102 of FIG. 1 or a three-core magnetic structure 302 of FIG. 3 in accordance with an illustrative embodiment. Core-assembly mechanism 500 comprises bobbin mechanism 502 and supports 504 and 506. Bobbin mechanism 502, support 504, and support 506 are each coupled to substrate 508 via, for example, pins 510 mounted to the underside of bobbin mechanism 502, support 504, and support 506. Bobbin mechanism 502 includes first duct 512 so that I core 514 may be inserted through the length of bobbin mechanism 502 as shown by arrow 516. Additionally, bobbin mechanism 502 includes second duct 518 and third duct 524 so that E-cores 520 and 522 may be inserted into the width of bobbin mechanism 502 as shown by arrow 526 and 528, respectively. Supports 504 and 506 support the underside of E-cores 520 and 522, respectively, after they have been inserted into second ducts 518.

Thus, in the illustrative embodiments, one illustrative embodiment provides a full-bridge current-doubler rectifier that, based on drive signals input into the full-bridge rectifier circuitry, provides a doubling of output current across a load in the current-doubling circuitry. Thus, in this embodiment the inductance detected in a second E core is controlled by an air gap between the I-core and the outer leg of each E-core. This width of the air gap may be controlled by the ways the cores are mechanically designed to precisely position and control the width. The second embodiment provides an interleaved two-switch forward converter that, based on drive signals input into the first and second two-switch forward circuitry, provides a constant output DC voltage. The third embodiment provides a core-assembly mechanism for assembling a three-core magnetic structure, such as three-core magnetic structures of the first two embodiments.

Figure 6:
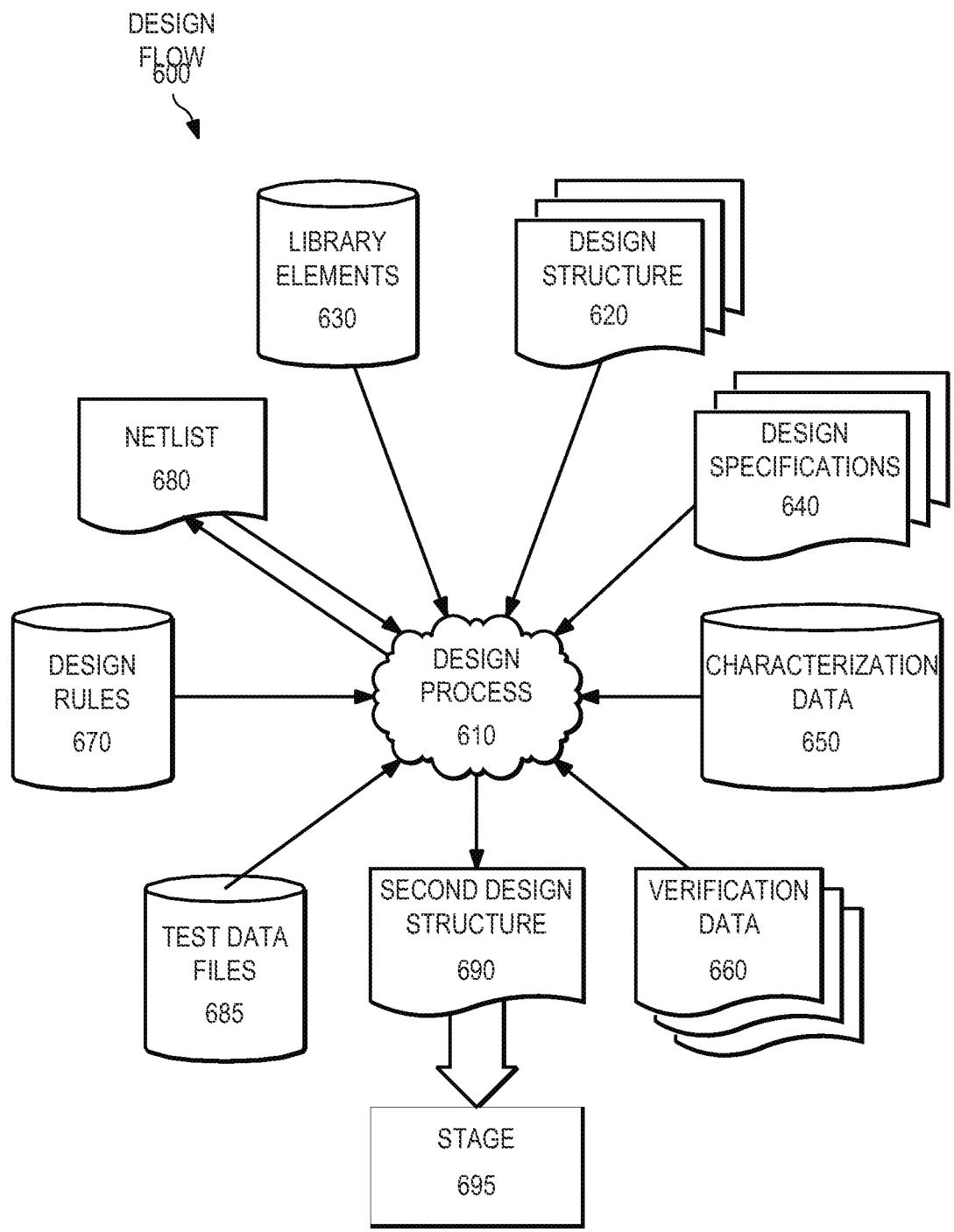
FIG. 6 shows a block diagram of an exemplary design flow used, for example, in semiconductor IC logic design, simulation, test, layout, and manufacture.

FIG. 6 shows a block diagram of an exemplary design flow 600 used, for example, in semiconductor IC logic design, simulation, test, layout, and manufacture. Design flow 600 includes processes and mechanisms for processing design structures to generate logically or otherwise functionally equivalent representations of the embodiments of the invention shown in FIGS. 1-5. The design structures processed and/or generated by design flow 600 may be encoded on machine-readable transmission or storage media to include data and/or instructions that when executed or otherwise processed on a data processing system generate a logically, structurally, or otherwise functionally equivalent representation of hardware components, circuits, devices, or systems.

FIG. 6 illustrates multiple such design structures including an input design structure 620 that is preferably processed by a design process 610. Design structure 620 may be a logical simulation design structure generated and processed by design process 610 to produce a logically equivalent functional representation of a hardware device. Design structure 620 may also or alternatively comprise data and/or program instructions that when processed by design process 610, generate a functional representation of the physical structure of a hardware device. Whether representing functional and/or structural design features, design structure 620 may be generated using electronic computer-aided design (ECAD) such as implemented by a core developer/designer. When encoded on a machine-readable data transmission or storage medium, design structure 620 may be accessed and processed by one or more hardware and/or software modules within design process 610 to simulate or otherwise functionally represent an electronic component, circuit, electronic or logic module, apparatus, device, or system such as those shown in FIGS. 1-5. As such, design structure 620 may comprise files or other data structures including human and/or machine-readable source code, compiled structures, and computer-executable code structures that when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++.

Design process 610 preferably employs and incorporates hardware and/or software modules for synthesizing, translating, or otherwise processing a design/simulation functional equivalent of the components, circuits, devices, or logic structures shown in FIGS. 1-5 to generate a netlist 680 which may contain design structures such as design structure 620. Netlist 680 may include, for example, compiled or otherwise processed data structures representing a list of wires, discrete components, logic gates, control circuits, I/O devices, models, etc. that describes the connections to other elements and circuits in an integrated circuit design. Netlist 680 may be synthesized using an iterative process in which netlist 680 is resynthesized one or more times depending on design specifications and parameters for the device. As with other design structure types described herein, netlist 680 may be recorded on a machine-readable data storage medium. The medium may be a non-volatile storage medium such as a magnetic or optical disk drive, a compact flash, or other flash memory. Additionally, or in the alternative, the medium may be a system or cache memory, buffer space, or electrically or optically conductive devices and materials on which data packets may be transmitted and intermediately stored via the Internet, or other networking suitable means.

Design process 610 may include hardware and software modules for processing a variety of input data structure types including netlist 680. Such data structure types may reside, for example, within library elements 630 and include a set of commonly used elements, circuits, and devices, including models, layouts, and symbolic representations, for a given manufacturing technology (e.g., different technology nodes, 32 nm, 45 nm, 90 nm, etc.). The data structure types may further include design specifications 640, characterization data 650, verification data 660, design rules 670, and test data files 685 which may include input test patterns, output test results, and other testing information. Design process 610 may further include modules for performing standard circuit design processes such as timing analysis, verification, design rule checking, place and route operations, etc.

Design process 610 employs and incorporates well-known logic and physical design tools such as HDL compilers and simulation model build tools to process design structure 620 together with some or all of the depicted supporting data structures to generate a second design structure 690. Similar to design structure 620, second design structure 690 preferably comprises one or more files, data structures, or other computer-encoded data or instructions that reside on transmission or data storage media and that when processed by an ECAD system generate a logically or otherwise functionally equivalent form of one or more of the embodiments of the invention shown in FIGS. 1-5. In one embodiment, second design structure 690 may comprise a compiled, executable HDL simulation model that functionally simulates the devices shown in FIGS. 1-5.

Second design structure 690 may also employ a data format used for the exchange of layout data of integrated circuits and/or symbolic data format (e.g. information stored in a GDSII (GDS2), GL1, OASIS, map files, or any other suitable format for storing such design data structures). Second design structure 690 may comprise information such as, for example, symbolic data, map files, test data files, design content files, manufacturing data, layout parameters, wires, levels of metal, vias, shapes, data for routing through the manufacturing line, and any other data processed by semiconductor manufacturing tools to fabricate embodiments of the invention as shown in FIGS. 1-5. Second design structure 690 may then proceed to a stage 695 where, for example, second design structure 690 proceeds to tape-out, is released to manufacturing, is released to a mask house, is sent to another design house, is sent back to the customer, etc.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. An apparatus for doubling the current of a circuit via a full-bridge current-doubler rectifier, the apparatus comprising:
   a three-core magnetic structure electrically coupled to an input circuit, wherein the three-core magnetic structure comprises a first E core, a second E core, and an I core, wherein the first E core has three legs, the second E core has three legs, the legs of the first E core face the legs of the second E core with the I core inserted between the legs of the first E core and the second E core, the legs of the first E core are separated from the I core by a first preselected precise gap, and the legs of the second E core are separated from the I core by a second preselected precise gap;
   a first drive signal driving a first set of transistors thereby causing a first voltage to be induced into a primary winding of the three-core magnetic structure;
   a second drive signal driving a second set of transistors thereby causing a second voltage to be induced into the primary winding, wherein the first drive signal operates out-of-phase with the second drive signal and wherein, by the first drive signal operating out-of-phase, a varying magnetic field is impinged on a secondary winding of an output circuit electrically coupled to the three-core magnetic structure;
   the secondary winding detecting the varying magnetic field induced by the primary winding; and
   the output circuit outputting a current as a result of the varying magnetic field, wherein the current is doubled by summing an average current flowing through a first inductor winding and an average current flowing through a second inductor winding.

2. The apparatus of claim 1, wherein the first preselected precise gap is less than 10 microns.

3. The apparatus of claim 1, wherein the second preselected precise gap controls the flux detected by in the first inductor winding and the second inductor winding.

4. The apparatus of claim 1, wherein the primary winding and the secondary winding are coiled around a middle leg of the three legs of the first E core.

5. The apparatus of claim 1, wherein the first inductor winding is coiled around a first outer leg of the three legs of the second E core, and wherein the second inductor winding is coiled around a second outer leg of the three legs of the second E core.

6. The apparatus of claim 1, wherein:
the input circuit comprises a first N-channel metal-oxide-semiconductor field-effect transistor (MOSFET) (NMOS), a second NMOS, a third NMOS, and a fourth NMOS;
the first NMOS and the fourth NMOS make up the first set of transistors and the second NMOS and the third NMOS make up the second set of transistors;
a drain of the first NMOS is coupled to a drain of the third NMOS and a DC input voltage, a source of the first NMOS is coupled to a drain of the second NMOS, and a gate of the first NMOS is coupled to a first input drive signal;
the drain of the second NMOS is coupled to the source of the first NMOS, a source of the second NMOS is coupled to a source of the fourth NMOS and a primary DC return, and a gate of the second NMOS is coupled to the second input drive signal;
the drain of the third NMOS is coupled to the drain of the first NMOS and the DC input voltage, a source of the third NMOS is coupled to a drain of the fourth NMOS, and a gate of the third NMOS is coupled to the second input drive signal; and
the drain of the fourth NMOS is coupled to the source of the third NMOS, the source of the fourth NMOS is coupled to the source of the second NMOS and the primary DC return, and the gate of the fourth NMOS is coupled to the first input drive signal.

7. The apparatus of claim 1, wherein:
the primary winding is coiled around a middle leg of the three legs of the first E core;
a first end of the primary winding is coupled to a source of a first N-channel metal-oxide-semiconductor field-effect transistor (MOSFET) (NMOS) and a drain of a second NMOS; and
a second end of the primary winding is coupled to a source of a third NMOS and a drain of a fourth NMOS.

8. The apparatus of claim 1, wherein:
the output circuit comprises a first diode, a second diode, a capacitor, and a resistor;
an anode of the first diode is coupled to an anode of the second diode, a second side of the capacitor, a second side of the resistor, and to a ground;
a cathode of the first diode is coupled to a cathode of the second diode via the secondary winding;
the cathode of the first diode is coupled to a first side of the capacitor and a first side of the resistor via a first inductor coil; and
the cathode of second diode is coupled to the first side of the capacitor and the first side of the resistor via a second inductor coil.

9. The apparatus of claim 4, wherein the first inductor winding is coiled around a first outer leg of the three legs of the second E core, and wherein the second inductor winding is coiled around a second outer leg of the three legs of the second E core.

10. The apparatus of claim 9, wherein:
the output circuit comprises a first diode, a second diode, a capacitor, and a resistor;
an anode of the first diode is coupled to an anode of the second diode, a second side of the capacitor, a second side of the resistor, and to a ground;
a cathode of the first diode is coupled to a cathode of the second diode via the secondary winding;
the cathode of the first diode is coupled to a first side of the capacitor and a first side of the resistor via a first inductor coil; and
the cathode of second diode is coupled to the first side of the capacitor and the first side of the resistor via a second inductor coil.

11. The apparatus of claim 9, wherein:
the input circuit comprises a first N-channel metal-oxide-semiconductor field-effect transistor (MOSFET) (NMOS), a second NMOS, a third NMOS, and a fourth NMOS;
the first NMOS and the fourth NMOS make up the first set of transistors and the second NMOS and the third NMOS make up the second set of transistors;
a drain of the first NMOS is coupled to a drain of the third NMOS and a DC input voltage, a source of the first NMOS is coupled to a drain of the second NMOS, and a gate of the first NMOS is coupled to a first input drive signal;
the drain of the second NMOS is coupled to the source of the first NMOS, a source of the second NMOS is coupled to a source of the fourth NMOS and a primary DC return, and a gate of the second NMOS is coupled to the second input drive signal;
the drain of the third NMOS is coupled to the drain of the first NMOS and the DC input voltage, a source of the third NMOS is coupled to a drain of the fourth NMOS, and a gate of the third NMOS is coupled to the second input drive signal; and
the drain of the fourth NMOS is coupled to the source of the third NMOS, the source of the fourth NMOS is coupled to the source of the second NMOS and the primary DC return, and the gate of the fourth NMOS is coupled to the first input drive signal.

12. The apparatus of claim 11, wherein:
a first end of the primary winding is coupled to the source of the first N-channel metal-oxide-semiconductor field-effect transistor (MOSFET) (NMOS) and a drain of a second NMOS; and
a second end of the primary winding is coupled to a source of a third NMOS and a drain of a fourth NMOS.

13. The apparatus of claim 12, wherein:
the output circuit comprises a first diode, a second diode, a capacitor, and a resistor;
an anode of the first diode is coupled to an anode of the second diode, a second side of the capacitor, a second side of the resistor, and to a ground;
a cathode of the first diode is coupled to a cathode of the second diode via the secondary winding;
the cathode of the first diode is coupled to a first side of the capacitor and a first side of the resistor via a first inductor coil; and
the cathode of second diode is coupled to the first side of the capacitor and the first side of the resistor via a second inductor coil.

14. The apparatus of claim 4, wherein:
the input circuit comprises a first N-channel metal-oxide-semiconductor field-effect transistor (MOSFET) (NMOS), a second NMOS, a third NMOS, and a fourth NMOS;
the first NMOS and the fourth NMOS make up the first set of transistors and the second NMOS and the third NMOS make up the second set of transistors;
a drain of the first NMOS is coupled to a drain of the third NMOS and a DC input voltage, a source of the first NMOS is coupled to a drain of the second NMOS, and a gate of the first NMOS is coupled to a first input drive signal;

the drain of the second NMOS is coupled to the source of the first NMOS, a source of the second NMOS is coupled to a source of the fourth NMOS and a primary DC return, and a gate of the second NMOS is coupled to the second input drive signal;

the drain of the third NMOS is coupled to the drain of the first NMOS and the DC input voltage, a source of the third NMOS is coupled to a drain of the fourth NMOS, and a gate of the third NMOS is coupled to the second input drive signal; and the drain of the fourth NMOS is coupled to the source of the third NMOS, the source of the fourth NMOS is coupled to the source of the second NMOS and the primary DC return, and the gate of the fourth NMOS is coupled to the first input drive signal.

15. An apparatus for doubling the current of a circuit via a full-bridge current-doubler rectifier, the apparatus comprising:

a three-core magnetic structure electrically coupled to an input circuit;

a first drive signal driving a first set of transistors thereby causing a first voltage to be induced into a primary winding of the three-core magnetic structure;

a second drive signal driving a second set of transistors thereby causing a second voltage to be induced into the primary winding, wherein the first drive signal operates out-of-phase with the second drive signal and wherein, by the first drive signal operating out-of-phase, a varying magnetic field is impinged on a secondary winding of an output circuit electrically coupled to the three-core magnetic structure;

the secondary winding detecting the varying magnetic field induced by the primary winding;

the output circuit outputting a current as a result of the varying magnetic field, wherein the current is doubled by summing an average current flowing through a first inductor winding and an average current flowing through a second inductor winding;

the input circuit comprising a first N-channel metal-oxide-semiconductor field-effect transistor (MOSFET) (NMOS), a second NMOS, a third NMOS, and a fourth NMOS;

the first NMOS and the fourth NMOS make up the first set of transistors and the second NMOS and the third NMOS make up the second set of transistors;

a drain of the first NMOS coupled to a drain of the third NMOS and a DC input voltage, a source of the first NMOS is coupled to a drain of the second NMOS, and a gate of the first NMOS is coupled to a first input drive signal;

the drain of the second NMOS coupled to the source of the first NMOS, a source of the second NMOS is coupled to a source of the fourth NMOS and a primary DC return, and a gate of the second NMOS is coupled to the second input drive signal;

the drain of the third NMOS coupled to the drain of the first NMOS and the DC input voltage, a source of the third NMOS is coupled to a drain of the fourth NMOS, and a gate of the third NMOS is coupled to the second input drive signal; and the drain of the fourth NMOS coupled to the source of the third NMOS, the source of the fourth NMOS is coupled to the source of the second NMOS and the primary DC return, and the gate of the fourth NMOS is coupled to the first input drive signal.

16. An apparatus for doubling the current of a circuit via a full-bridge current-doubler rectifier, the apparatus comprising:

a three-core magnetic structure electrically coupled to an input circuit;

a first drive signal driving a first set of transistors thereby causing a first voltage to be induced into a primary winding of the three-core magnetic structure;

a second drive signal driving a second set of transistors thereby causing a second voltage to be induced into the primary winding, wherein the first drive signal operates out-of-phase with the second drive signal and wherein, by the first drive signal operating out-of-phase, a varying magnetic field is impinged on a secondary winding of an output circuit electrically coupled to the three-core magnetic structure;

the secondary winding detecting the varying magnetic field induced by the primary winding;

the output circuit outputting a current as a result of the varying magnetic field, wherein the current is doubled by summing an average current flowing through a first inductor winding and an average current flowing through a second inductor winding;

the output circuit comprising a first diode, a second diode, a capacitor, and a resistor;

an anode of the first diode coupled to an anode of the second diode, a second side of the capacitor, a second side of the resistor, and to a ground;

a cathode of the first diode coupled to a cathode of the second diode via the secondary winding;

the cathode of the first diode coupled to a first side of the capacitor and a first side of the resistor via a first inductor coil; and the cathode of second diode coupled to the first side of the capacitor and the first side of the resistor via a second inductor coil.

* * * * *